United States Patent
Kim et al.

(10) Patent No.: US 9,079,362 B2
(45) Date of Patent: Jul. 14, 2015

(54) APPARATUS FOR MANUFACTURING A HIGH-STRENGTH COMPOSITE SHEET HAVING SUPERIOR EMBEDDABILITY, AND METHOD FOR MANUFACTURING A HIGH-STRENGTH COMPOSITE SHEET USING THE SAME

(75) Inventors: Hee-June Kim, Seongnam-si (KR); Myung-Chul Park, Daejeon (KR); Hyun-Young Cho, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 75 days.

(21) Appl. No.: 13/995,849

(22) PCT Filed: Jan. 11, 2012

(86) PCT No.: PCT/KR2012/000264
§ 371 (c)(1),
(2), (4) Date: Jun. 19, 2013

(87) PCT Pub. No.: WO2012/096506
PCT Pub. Date: Jul. 19, 2012

(65) Prior Publication Data
US 2013/0270736 A1    Oct. 17, 2013

(30) Foreign Application Priority Data
Jan. 14, 2011   (KR) .................... 10-2011-0003858

(51) Int. Cl.
*B32B 37/00*   (2006.01)
*B29C 70/02*   (2006.01)
(Continued)

(52) U.S. Cl.
CPC .............. *B29C 70/021* (2013.01); *B29C 70/50* (2013.01); *B29C 70/545* (2013.01); *B29K 2105/0005* (2013.01)

(58) Field of Classification Search
CPC .... B29C 70/50; B29C 70/021; B29C 70/506; B32B 37/203; B32B 38/08
USPC ........... 156/298, 308.2, 309.6, 311, 324, 582; 264/257
See application file for complete search history.

(56) References Cited

U.S. PATENT DOCUMENTS 3,223,027 A * 12/1965 Soda et al. .................... 100/310
3,490,972 A *  1/1970 Rogers ......................... 156/162
(Continued)

FOREIGN PATENT DOCUMENTS

| CN | 1334892 A | 2/2002 |
| EP | 671431 A1 * | 9/1995 |

(Continued)

OTHER PUBLICATIONS

Machine translation of JP 05171557 date unknown.*
(Continued)

*Primary Examiner* — John Goff
(74) *Attorney, Agent, or Firm* — Lowe Hauptman & Ham, LLP

(57) ABSTRACT

Disclosed is a method for manufacturing a high-strength composite sheet, in which a peroxide-containing polymer film is used to allow uniform molecular weight distribution and improved embeddability. The method includes: attaching a peroxide-containing polymer film to one or both sides of a reinforcement material; pressing the peroxide-containing polymer film using a heating press such that the peroxide-containing polymer film is embedded into the reinforcement material, to thereby form a composite film; and cooling the pressed composite film using a cooling press.

14 Claims, 2 Drawing Sheets

(51) Int. Cl.
  *B29C 70/50* (2006.01)
  *B29C 70/54* (2006.01)
  *B29K 105/00* (2006.01)

(56) References Cited

U.S. PATENT DOCUMENTS

| | | | | |
|---|---|---|---|---|
| 4,395,459 | A | * | 7/1983 | Herschdorfer et al. ....... 428/391 |
| 4,816,326 | A | * | 3/1989 | Jones et al. ................... 428/119 |
| 5,039,730 | A | * | 8/1991 | Yokoyama .................... 524/504 |
| 5,665,295 | A | | 9/1997 | Takamoto et al. |
| 5,716,479 | A | | 2/1998 | Mikats et al. |

FOREIGN PATENT DOCUMENTS

| | | | |
|---|---|---|---|
| JP | 05171557 | A * | 7/1993 |
| JP | 05269739 | A | 10/1993 |
| JP | 0880601 | A | 3/1996 |
| JP | 3040229 | | 3/2000 |
| JP | 2006001021 | A | 1/2006 |
| JP | 2006290921 | A | 10/2006 |
| KR | 1020090099215 | | 9/2009 |
| KR | 1020100120888 | | 11/2010 |

OTHER PUBLICATIONS

International Search Report mailed Sep. 20, 2012 for PCT/KR2012/000264.
Chinese Office Action dated Oct. 30, 2014.
Japanese Office Action dated Aug. 29, 2014.
Japanese Notice of Allowance dated Feb. 10, 2015, citing the above reference(s).
Korean Office Action dated Feb. 21, 2014, citing the above reference(s) — please put this document in the file without consideration.

* cited by examiner

APPARATUS FOR MANUFACTURING A HIGH-STRENGTH COMPOSITE SHEET HAVING SUPERIOR EMBEDDABILITY, AND METHOD FOR MANUFACTURING A HIGH-STRENGTH COMPOSITE SHEET USING THE SAME

TECHNICAL FIELD

The present invention relates to an apparatus and method for manufacturing a high-strength composite sheet, and more particularly, to an apparatus for manufacturing a high-strength composite sheet, in which a polymer film containing peroxide is used to achieve uniform distribution of molecular weight while improving embeddability, and a method for manufacturing a high-strength composite sheet using the same.

BACKGROUND ART

Recently, recycled plastic products are used instead of metal for weight reduction. Generally, plastic products produced by, for example, injection-molding using only a thermoplastic resin are poor replacements for metal due to insufficient strength and rigidity thereof.

To solve this problem, plastic products in which a reinforcement material is embedded into a thermoplastic resin are increasingly used for replacement of metal.

Generally, high-strength thermoplastic plastic is divided into Glass Mat Thermoplastic (GMT), Granule-Long Fiber reinforced Thermoplastic (G-LFT), and Direct Long Fiber reinforced Thermoplastic (LTF-D).

Although high-strength thermoplastic plastic reinforces impact strength, flexural modulus and flexural strength using filaments rather than staple composite materials, a continuous fiber-reinforced, high-strength, high-rigidity material is required for some auto-components such as bumper beams, seatbacks, and the like.

Although such reinforcement materials are manufactured in the form of plastic composite sheets, their physical properties vary according to manufacturing methods. Here, thermoplastic plastic composite sheets are manufactured through embedding of woven glass fibers.

Particularly, in the case of producing GMT, although embedment of glass fibers and a polymer are induced through a belt pressing operation, it is difficult for existing techniques to achieve desired strength and rigidity.

DISCLOSURE

Technical Problem

An aspect of the present invention is to provide a method of manufacturing a high-strength composite sheet by improving embeddability of a polymer film and a reinforcement material.

Another aspect of the present invention is to provide an apparatus for manufacturing a high-strength composite sheet.

Technical Solution

In accordance with one aspect of the present invention, a method of manufacturing a high-strength composite sheet includes: attaching a peroxide-containing polymer film to one or both sides of a reinforcement material; pressing the peroxide-containing polymer film using a heating press such that the peroxide-containing polymer film is embedded in the reinforcement material, to thereby form a composite film; and cooling the pressed composite film using a cooling press.

In another aspect of the present invention, an apparatus for manufacturing a high-strength composite sheet includes: a first roll around which a reinforcement material is wound; a second roll around which a peroxide-containing polymer film is wound, the peroxide-containing film being attached to one or both sides of the reinforcement material unwound from the first roll; a conveying unit conveying the peroxide-containing polymer film being attached to the reinforcement material unwound from the first and second rolls; a heating press hot-pressing the peroxide-containing polymer film onto the reinforcement material while the peroxide-containing polymer film is conveyed by the conveying unit, such that the peroxide-containing polymer film is embedded into the reinforcement material, thereby forming a composite film; and a cooling press cooling the pressed composite film.

Advantageous Effects

In a high-strength composite sheet manufactured by the method according to the present invention, a peroxide-containing polymer film attached to one or both sides of a reinforcement material is subjected to continuous hot pressing and cooling using a hot press and a cooling press, whereby the polymer film can be embedded into the reinforcement material with uniform distribution of molecular weight throughout the reinforcement material, thereby improving physical properties.

BEST MODE

Figure 1:
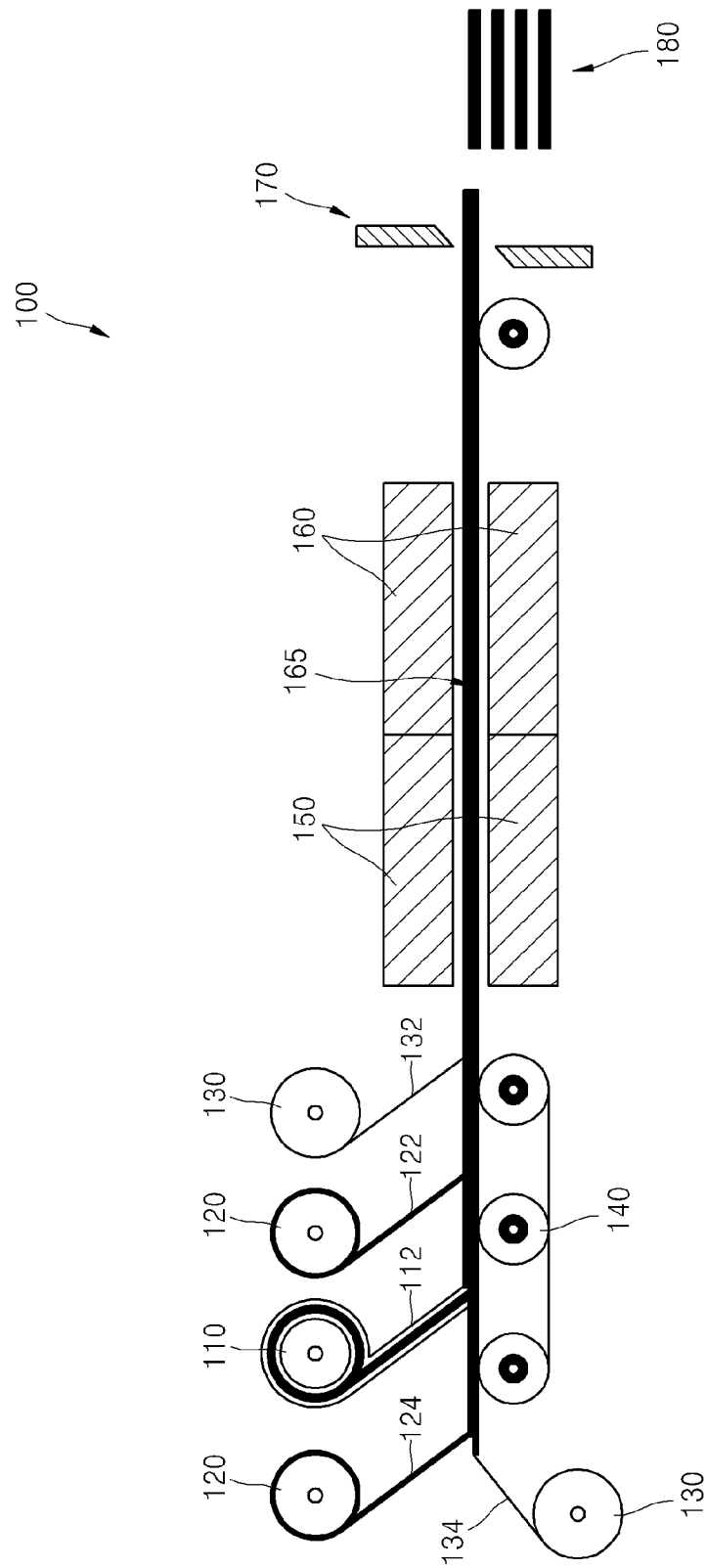
FIG. 1 is a cross-sectional view of an apparatus for manufacturing a high-strength composite sheet according to one embodiment of the present invention.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the invention by those skilled in the art. The scope of the invention is defined only by the claims. Like components will be denoted by like reference numerals throughout the specification.

A description will now be given of an apparatus and method for manufacturing a high-strength composite sheet having improved embeddability with reference to the accompanying drawings.

FIG. 1 is a cross-sectional view of an apparatus for manufacturing a high-strength composite sheet according to one embodiment of the present invention.

Referring to FIG. 1, an apparatus 100 for manufacturing a high-strength composite sheet according to one embodiment includes a first roll 110, second rolls 120, a conveying unit 140, a heating press 150, a cooling press, and a cutting unit 170.

A reinforcement material 112 is wound around the first roll 110, and first and second peroxide-containing polymer films 122, 124 are wound around the second rolls 120.

Here, as the reinforcement material 112 is first unwound from the first roll 110, the first and second peroxide-containing polymer films 122, 124 are secondarily attached to both sides of the reinforcement material 112 while respectively being unwound from the second rolls 120. The first roll 110 and the second rolls 120 may be disposed in close proximity to each other, but their locations may be selectively changed.

Although the first and second polymer films 122, 124 are illustrated as being attached to both sides of the reinforcement material 112 in this embodiment, the first or second polymer film 122 or 124 may be attached to one side of the reinforcement material 112.

The conveying unit 140 conveys the reinforcement material 112 and the first and second peroxide-containing polymer films 122, 124, which are unwound from the first roll 110 and the second rolls 120, respectively, toward the heating press 150 described below.

While the first and second polymer films 122, 124 are conveyed by the conveying unit 140, the heating press 150 hot-presses the first and second polymer films 122, 124 on the reinforcement material 112 such that the polymer films are embedded into the reinforcement material, thereby forming a composite film 165. Here, the heating press 150 may be located at a second position that is separated a distance from a first position where the first and seconds rolls 110, 120 are placed.

The cooling press 160 is disposed behind the heating press 150 to cool the composite film 165, which has been hot-pressed by the heating press 150, to a certain temperature. Here, in order to accomplish a continuous hot pressing-cooling operation, the heating press 150 and the cooling press 160 may be disposed as close to each other as possible.

The cutting unit 170 cuts the composite film 165, which has passed through the cooling press 160, into a plurality of composite sheets 180 to conform to a set standard size.

In addition, the apparatus 100 may further include third rolls 130, around which first and second release films 132, 134 are wound to be attached to both sides of the first and second polymer films 122, 124. Alternatively, the first or second release film 132 or 134 may be attached to an outer surface of the first or second polymer film 122 or 124.

In manufacture of a high-strength composite sheet using the apparatus according to the embodiment with the structure described above, the first and second peroxide-containing polymer films and the reinforcement material are subjected to a continuous process of hot-pressing and cooling using the heating press and the cooling press, such that the first and second peroxide-containing polymer films are attached to both sides of the reinforcement material to form a composite film. Thus, the polymer film may be embedded into the reinforcement material with uniform distribution of the molecular weight of the polymer film throughout the reinforcement material, thereby improving physical properties.

This will be described in more detail in a description of a method of manufacturing a high-strength composite sheet according to one embodiment of the present invention with reference to the accompanying drawings.

Figure 2:
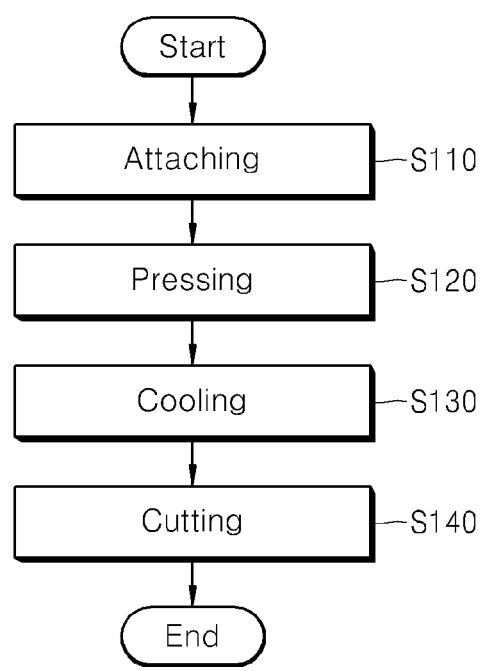
FIG. 2 is a flowchart of a method of manufacturing a high-strength composite sheet according to one embodiment of the present invention.

FIG. 2 is a flowchart of a method of manufacturing a high-strength composite sheet according to one embodiment of the present invention.

Referring to FIGS. 1 and 2, the method includes an attachment operation (S110), a pressing operation (S120), a cooling operation (S130), and a cutting operation (S140).

In the attachment operation (S110), first and second peroxide-containing polymer films 122, 124 are attached to both sides of a reinforcement material 112.

Here, as the reinforcement material 112 is first unwound from the first roll 110, the first and second peroxide-containing polymer films 122, 124 are secondarily attached to both sides of the reinforcement material 112 while being unwound from the second rolls 120.

Next, the reinforcement material 112 is conveyed, while interposed between the first and second polymer films 122, 124, towards the heating press 150 by the conveying unit 140.

Here, the first or second release film 132 or 134, which can be wound around the third roll 130, may be further attached to an outer surface of the first or second polymer film 122 or 124.

The reinforcement material 112 may include at least one fiber selected from organic or inorganic fibers, such as glass fibers, carbon fibers, basalt fibers, and aramid fibers.

The reinforcement material 112 may have an average fiber diameter ranging from 10 μm to 20 μm.

Further, a bundle of fibers in the reinforcement material 112 may have a density ranging from 600 tex to 1200 tex.

Here, the reinforcement material 112 may be present in an amount of 20 parts by weight to 80 parts by weight based on 100 parts by weight of the composite sheet.

The first and second polymer films 122, 124 may include at least one resin selected from among thermoplastic and thermosetting resins including polypropylene, polyethylene, polyester, polyamide, and acrylonitrile butadiene styrene (ABS) copolymers.

Particularly, the thermoplastic resin may have a melt index (MFI) ranging from 1 g/10 min to 100 g/10 min, more preferably from 10 g/10 min to 30 g/10 min. If the melt index of thermoplastic resin is less than 1 g/10 min, the thermoplastic resin is likely to be cured, thereby causing degradation of embeddability, whereas if the melt index is greater than 100 g/10 min, the thermoplastic resin can flow down.

The first and second polymer films 122, 124 may further include at least one kind of additive selected from among pigments, thermal stabilizers, UV stabilizers, and viscosity controlling agents.

Here, the viscosity controlling agent may be present in an amount of 0.5 parts by weight to 4 parts by weight and the other additives may be present in an amount of 0.1 parts by weight to 10 parts by weight, based on 100 parts by weight of the first and second polymer films, wherein the viscosity controlling agent may further contain peroxide.

Here, the peroxide may include at least one component selected from among 3,6,6,9,9 pentamethyl-3n-propyl-1,2,4,5 tetraoxacyclononane, 3,6,9-triethyl-3,6,9-trimethyl-1,4,7-triperoxonane, 2,5-dimethyl-2,5-bis(t-butylperoxy)hexane, and the like.

The peroxide may be present in an amount of 0.5 parts by weight to 4 parts by weight based on 100 parts by weight of the first and second polymer films. If the amount of the peroxide is less than 0.5 parts by weight, it is difficult to ensure sufficient embedding effects due to excessively low peroxide content, and if the amount of the peroxide is greater than 4 parts by weight, there is a problem of an unnecessary increase in manufacturing costs without additional increase in embedding effects.

In the pressing operation (S120), the first and second peroxide-containing polymer films 122, 124 are hot-pressed on the reinforcement material 112 by the heating press 150 such that the polymer films are embedded into the reinforcement material 112, thereby forming a composite film 165.

In the cooling operation (S130), the hot-pressed composite film 165 is cooled to a certain temperature or less using the cooling press 160. Here, the pressing operation (S120) and the cooling operation (S130) may be performed in a continuous process.

According to the present invention, the first and second peroxide-containing polymer films 122, 124 attached to both sides of the reinforcement material 165 are continuously hot-pressed and cooled while passing through the heating press 150 and the cooling press 160. Thus, the first and second peroxide-containing polymer films 122, 124 are rapidly permeated into the reinforcement material 165 to induce uniform distribution of the molecular weight of the polymer films throughout the reinforcement material during embedding of the polymer films into the reinforcement material, thereby securing excellent mechanical properties.

In the cutting operation (S140), the composite film 165 sequentially having passed through the heating press 150 and the cooling press 160 by the conveying unit 140 is cut into a plurality of composite sheets 170 to comply to a standard size.

As set forth in the foregoing, in manufacture of a high-strength composite sheet by the method according to the present invention, the first and second peroxide-containing polymer films attached to both sides of the reinforcement material are continuously hot-pressed and cooled through the heating press and the cooling press. Accordingly, the polymer films are embedded into the reinforcement material with uniform distribution of the molecular weight thereof throughout the reinforcement material, thereby achieving improved mechanical properties of the composite sheet.

EXAMPLES

Now, the construction and operation of the present invention will be described in more detail with reference to examples. However, it should be noted that these examples are provided for illustrative purposes and are not to be construed in any way as limiting the present invention.

Description of details apparent to those skilled in the art will be omitted for clarity.

1. Manufacture of High-Strength Composite Sheet

Example 1

Polypropylene films having a melt index of 35 g/10 min and comprising 1.0 part by weight of peroxide [2,5-dimethyle-2,5-bis(t-butylperoxy)hexane] and 3 parts by weight of pigments and thermal stabilizers were attached to both sides of a bundle of glass fibers having an average fiber diameter of 17 μm and a density of 600 tex, followed by hot-pressing using a heating press at 200° C. and cooling to 25° C. using a cooling press.

Then, a composite film of the glass fiber and the peroxide-containing polypropylene films passed through the cooling press was cut into a plurality of composite sheets having a certain size.

Example 2

Composite sheets were manufactured in the same manner as in Example 1, except that 2.0 parts by weight of the peroxide was used.

Example 3

Composite sheets were manufactured in the same manner as in Example 1, except that 3.0 parts by weight of the peroxide was used.

Example 4

Composite sheets were manufactured in the same manner as in Example 1, except that 4.0 parts by weight of the peroxide was used.

Comparative Example 1

Composite sheets were manufactured in the same manner as in Example 1, except that the peroxide was not used.

Comparative Example 2

Composite sheets were manufactured in the same manner as in Example 1, except that the bundle of glass fibers had an average fiber diameter of 12 μm and a density of 300 tex.

2. Evaluation of Physical Properties

Table 1 shows results of evaluation of physical properties of the composite sheets prepared in Examples 1 and 2. Flexural strength and embeddability (porosity; void content) were evaluated, and results are shown in Table 1. Here, the flexural strength was measured according to ASTM D790, and the embeddability was evaluated according to ASTM D2734.

TABLE 1

| | Flexural strength (MPa; ASTM D790) | Embeddability (Porosity, %; ASTM D2734) |
|---|---|---|
| Example 1 | 350 MPa | 4.8% |
| Example 2 | 372 MPa | 3.9% |
| Example 3 | 405 MPa | 3.2% |
| Example 4 | 404 MPa | 3.0% |
| Comparative Example 1 | 300 MPa | 6.0% |
| Comparative Example 2 | 409 MPa | 2.6% |

In Table 1, comparing Examples 1-4 with Comparative Example 1, it could be seen that the peroxide increased fluidity of the resin while effectively reducing porosity of the bundle of glass fibers, thereby increasing flexural strength. However, as can be seen in Example 4, when too much of the peroxide was added, the molecular weight of the resin was excessively reduced irrespective of improvement in embeddability, causing reduction in compression strength and flexural strength of the composite sheet.

The composite sheets of Examples 3 and 4 and Comparative Example 2 showed similar flexural strength. That is, although the composite sheets of Example 3 or 4 employed glass fibers having a higher density (600 tex) than the composite sheets employing glass fibers having a low density (300 tex) in Comparative Example 2, similar mechanical properties were obtained, thereby enabling reduction in manufacturing costs of the composite sheets.

Based on these test results, it can be seen that the composite sheet, which was manufactured by embedding the peroxide-containing polymer films into both sides of the reinforcement material, followed by a continuous process of hot-pressing and cooling of the composite film, has excellent mechanical strength and embeddability.

Although some embodiments have been described herein, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A method of manufacturing a high-strength composite sheet, the method comprising:
   attaching a peroxide-containing polymer film to at least one side of a reinforcement material;
   pressing the peroxide-containing polymer film using a heating press such that the peroxide-containing polymer film is embedded into the reinforcement material, to thereby form a composite film; and
   cooling the pressed composite film using a cooling press,
   wherein the peroxide-containing polymer film comprises at least one peroxide selected from the group consisting of 3,6,6,9,9 pentamethyl-3n-propyl-1,2,4,5 tetraoxacyclononane and 3,6,9-triethyl-3,6,9-trimethyl-1,4,7-triperoxonane,
   wherein the peroxide-containing polymer film further comprises the peroxide in an amount of greater than 2 parts by weight and at most 4 parts by weight, based on 100 parts by weight of the peroxide-containing polymer film, and
   wherein a bundle of fibers in the reinforcement material has a density ranging from 600 tex to 1200 tex.

2. The method according to claim 1, wherein the reinforcement material comprises organic or inorganic fibers, which include at least one selected from the group consisting of glass fibers, carbon fibers, basalt fibers, and aramid fibers.

3. The method according to claim 2, wherein the reinforcement material has an average fiber diameter ranging from 10 μm to 20 μm.

4. The method according to claim 1, wherein the peroxide-containing polymer film comprises thermoplastic or thermosetting resins, which include at least one selected from the group consisting of thermoplastic or thermosetting resins including polypropylene, polyethylene, polyester, polyamide, and acrylonitrile butadiene styrene (ABS) copolymers.

5. The method according to claim 4, wherein the thermoplastic resin has a melt index (MFI) of 1 to 100 g/10 min.

6. The method according to claim 4, wherein the peroxide-containing polymer film further comprises at least one kind of additive selected from among pigments, thermal stabilizers, UV stabilizers, or viscosity controlling agents.

7. The method according to claim 6, wherein the peroxide-containing polymer film comprises greater than 2 parts by weight and at most 4 parts by weight of the viscosity controlling agent and 0.1 to 10 parts by weight of the other additives, based on 100 parts by weight of the polymer film, the viscosity controlling agent containing peroxide.

8. The method according to claim 1, wherein the reinforcement material is present in an amount of 20 parts by weight to 80 parts by weight based on 100 parts by weight of the composite film.

9. The method according to claim 1, wherein the composite film further comprises a release film attached to an outer side of the peroxide-containing polymer film.

10. The method according to claim 1, wherein the heating press is configured to attach two peroxide-containing polymer films to a same side of the reinforcement material.

11. The method according to claim 1, wherein the reinforcement material comprises basalt fibers.

12. The method according to claim 1, wherein the peroxide-containing polymer film further comprises 2,5-dimethyl-2,5-bis(t-butylperoxy)hexane.

13. The method according to claim 1, wherein the peroxide-containing polymer film comprises acrylonitrile butadiene styrene (ABS) copolymers.

14. The method according to claim 4, wherein the peroxide-containing polymer film further comprises UV stabilizers.

* * * * *